United States Patent
Spence et al.

(10) Patent No.: US 9,573,496 B2
(45) Date of Patent: *Feb. 21, 2017

(54) INFANT CARRIER AND CAR SAFETY SEAT WITH NO-RETHREAD HARNESS ADJUSTMENT

(71) Applicant: KIDS II, INC., Atlanta, GA (US)

(72) Inventors: Scott R. Spence, Vinings, GA (US); Jacob Sclare, Dacula, GA (US); Michael A. Dotsey, Pottstown, PA (US); Noah E. Dingler, Phoenixville, PA (US); Patrick B. Nolan, Royersford, PA (US)

(73) Assignee: KIDS II, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,678

(22) Filed: Oct. 19, 2015

(65) Prior Publication Data
US 2016/0039318 A1 Feb. 11, 2016

Related U.S. Application Data

(63) Continuation of application No. 13/928,818, filed on Jun. 27, 2013, now Pat. No. 9,162,593.

(60) Provisional application No. 61/667,543, filed on Jul. 3, 2012, provisional application No. 61/698,942, filed on Sep. 10, 2012.

(51) Int. Cl.
| | |
|---|---|
| *A47D 1/10* | (2006.01) |
| *A47C 7/38* | (2006.01) |
| *B60R 22/10* | (2006.01) |
| *A62B 35/00* | (2006.01) |
| *B60N 2/28* | (2006.01) |
| *B60N 2/26* | (2006.01) |

(52) U.S. Cl.
CPC ........... *B60N 2/2812* (2013.01); *B60N 2/26* (2013.01); *B60N 2/265* (2013.01); *B60N 2/2821* (2013.01); *B60N 2/2845* (2013.01); *B60N 2/2851* (2013.01); *B60N 2/2875* (2013.01); *B60N 2002/2818* (2013.01); *Y10T 403/32237* (2015.01)

(58) Field of Classification Search
CPC .................................................... B60N 2/2851
USPC .............................. 297/250.1, 410, 480, 484
See application file for complete search history.

(56) References Cited

U.S. PATENT DOCUMENTS

| | | |
|---|---|---|
| 2,326,328 A | 8/1943 | Bush |
| 3,510,151 A | 5/1970 | Weman |
| 3,722,883 A | 3/1973 | O'Dowd |
| 4,181,356 A | 1/1980 | Fleischer |

(Continued)

FOREIGN PATENT DOCUMENTS

| | | |
|---|---|---|
| DE | 4412981 C1 | 8/1995 |
| WO | 2010088317 A1 | 8/2010 |

*Primary Examiner* — Rodney B White
*Assistant Examiner* — Jody Giacoman
(74) *Attorney, Agent, or Firm* — Gardner Groff Greenwald & Villanueva, PC

(57) ABSTRACT

A vehicle safety seat and infant carrier system allowing height adjustment of a shoulder harness strap without rethreading the harness strap through the seat. A positioning member is normally biased out of engagement with a toothed rail, allowing a harness strap carried by the positioning member to be adjusted up or down to fit the size of a child. As the harness strap is pulled tight, the positioning member is brought into engagement with the toothed rail, fixing the position of the strap relative to the seat.

19 Claims, 5 Drawing Sheets

(56) References Cited

U.S. PATENT DOCUMENTS

| | | |
|---|---|---|
| 4,415,200 A | 11/1983 | Bourne |
| 4,688,850 A | 8/1987 | Brownlie et al. |
| 4,702,523 A | 10/1987 | Schrader et al. |
| 4,762,364 A | 8/1988 | Young |
| 4,770,468 A | 9/1988 | Shubin |
| 4,790,601 A | 12/1988 | Burleigh et al. |
| 4,858,997 A | 8/1989 | Shubin |
| 5,082,325 A | 1/1992 | Sedlack |
| 5,383,711 A | 1/1995 | Houghteling |
| 5,449,323 A | 9/1995 | Melton |
| 5,813,367 A | 9/1998 | O'Brien |
| 6,030,047 A | 2/2000 | Kain |
| 6,135,553 A | 10/2000 | Lovie et al. |
| 6,155,638 A | 12/2000 | Bapst |
| 6,398,302 B1 | 6/2002 | Freedman et al. |
| 6,428,099 B1 | 8/2002 | Kain |
| 6,491,348 B1 | 12/2002 | Kain |
| 6,543,847 B2 | 4/2003 | Balensiefer |
| 6,572,189 B1 | 6/2003 | Blaymore |
| 6,623,074 B2 | 9/2003 | Asbach et al. |
| 6,626,493 B2 | 9/2003 | Kain |
| 6,688,685 B2 | 2/2004 | Kain |
| 6,695,412 B2 | 2/2004 | Barger et al. |
| 6,746,080 B2 | 6/2004 | Tsugimatsu et al. |
| 6,779,843 B2 | 8/2004 | Kain |
| 6,799,807 B1 | 10/2004 | Chen |
| 6,811,216 B2 | 11/2004 | Sedlack |
| 6,820,939 B1 | 11/2004 | Chen |
| 6,863,286 B2 | 3/2005 | Eros et al. |
| 6,913,313 B2 | 7/2005 | Sedlack |
| 7,066,536 B2 | 6/2006 | Williams et al. |
| 7,090,294 B2 | 8/2006 | Balensiefer, II et al. |
| 7,163,265 B2 | 1/2007 | Adachi |
| 7,188,897 B2 | 3/2007 | Patrizi et al. |
| 7,188,898 B2 | 3/2007 | Patterson et al. |
| 7,246,853 B2 | 7/2007 | Harcourt et al. |
| 7,246,854 B2 | 7/2007 | Dingman et al. |
| 7,246,855 B2 | 7/2007 | Langmaid et al. |
| 7,249,803 B2 | 7/2007 | Santamaria |
| 7,252,342 B2 | 8/2007 | Patrizi et al. |
| 7,387,336 B2 | 6/2008 | Sakumoto |
| 7,438,358 B2 | 10/2008 | Santamaria |
| 7,547,065 B2 | 6/2009 | Barger |
| 7,658,446 B2 | 2/2010 | Meeker et al. |
| 7,735,919 B2 | 6/2010 | Chen et al. |
| 7,740,313 B1 | 6/2010 | Hei et al. |
| 7,861,341 B2 | 1/2011 | Ayette et al. |
| 7,862,117 B2 | 1/2011 | Hutchinson et al. |
| 7,901,003 B2 | 3/2011 | Meeker et al. |
| 7,954,895 B2 | 6/2011 | Freeman et al. |
| 8,001,634 B2 | 8/2011 | Ayette et al. |
| 8,038,214 B2 | 10/2011 | Brandl et al. |
| 8,087,725 B2 | 1/2012 | Hutchinson et al. |
| 8,177,303 B2 | 5/2012 | Chen et al. |
| 8,226,162 B2 | 7/2012 | Campbell et al. |
| 8,342,604 B2 | 1/2013 | Heisey et al. |
| 8,434,821 B2 | 5/2013 | Gibree |
| 8,517,467 B2 | 8/2013 | Fritz et al. |
| 8,550,555 B2 | 10/2013 | Fritz et al. |
| 8,567,862 B2 | 10/2013 | Williams et al. |
| 8,573,695 B2 | 11/2013 | Van Geer et al. |
| 8,622,476 B2 | 1/2014 | Karremans et al. |
| 8,622,478 B2 | 1/2014 | Spence |
| 8,632,127 B2 | 1/2014 | Brunick et al. |
| 8,690,244 B2 | 4/2014 | Fritz et al. |
| 8,763,993 B2 | 7/2014 | Bohler |
| 8,764,108 B2 | 7/2014 | Gaudreau, Jr. |
| 8,801,096 B2 | 8/2014 | Brunick et al. |
| 8,845,032 B2 | 9/2014 | Bruce et al. |
| 8,870,285 B2 | 10/2014 | Williams et al. |
| 8,944,503 B2 | 2/2015 | Gates et al. |
| 8,973,991 B2 | 3/2015 | Wuerstl |
| 9,022,470 B2 | 5/2015 | Fujita et al. |
| 9,162,593 B2 * | 10/2015 | Spence ................ B60N 2/265 |
| 9,211,817 B2 | 12/2015 | Leese |
| 9,211,820 B2 | 12/2015 | Allen et al. |
| 2008/0258527 A1 | 10/2008 | Gower et al. |
| 2009/0015044 A1 | 1/2009 | Marsilio et al. |
| 2009/0127827 A1 | 5/2009 | Pike et al. |
| 2010/0038954 A1 | 2/2010 | Chen et al. |
| 2010/0264705 A1 * | 10/2010 | Karremans ......... B60N 2/2851 297/250.1 |
| 2012/0313413 A1 * | 12/2012 | Hutchinson ......... B60N 2/2812 297/250.1 |
| 2012/0326476 A1 | 12/2012 | Runk et al. |

\* cited by examiner

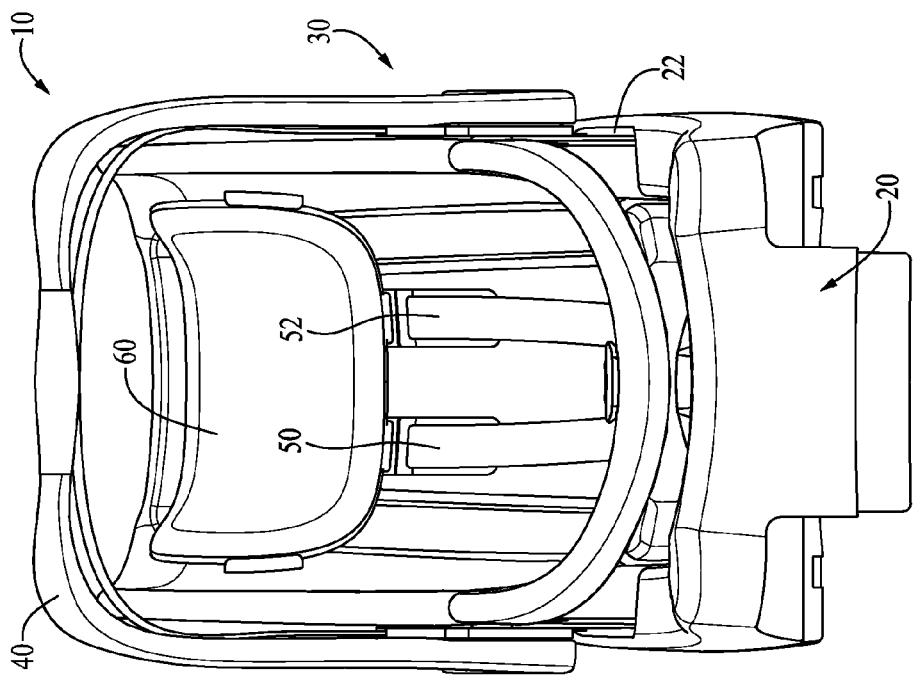
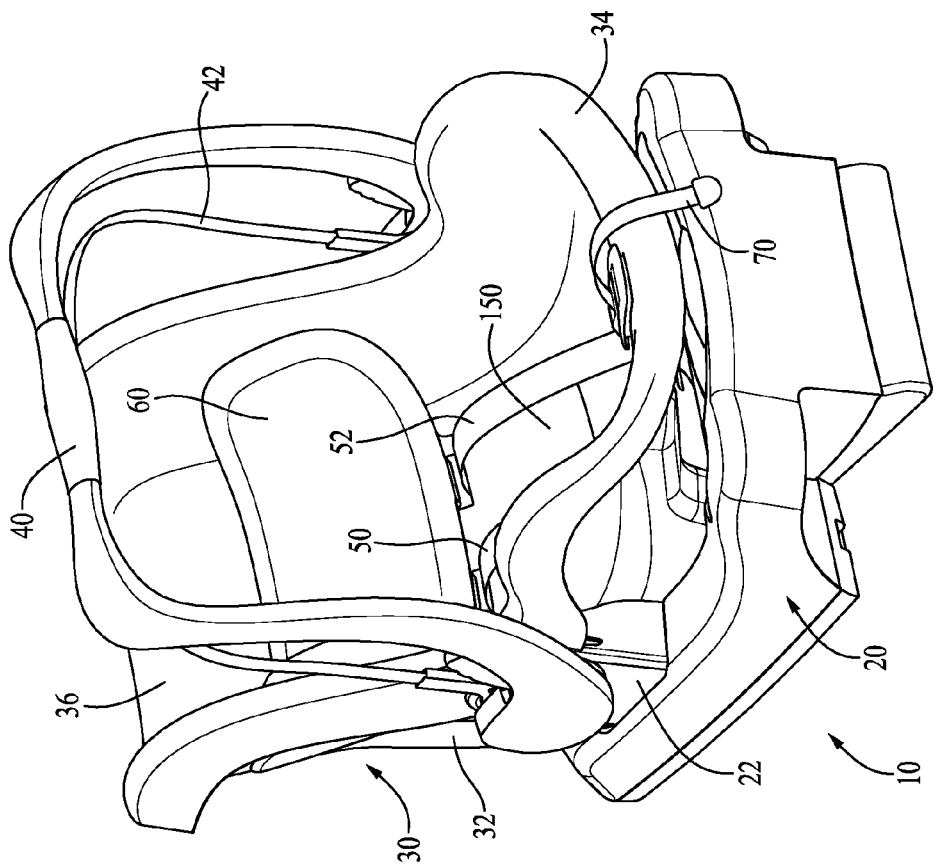

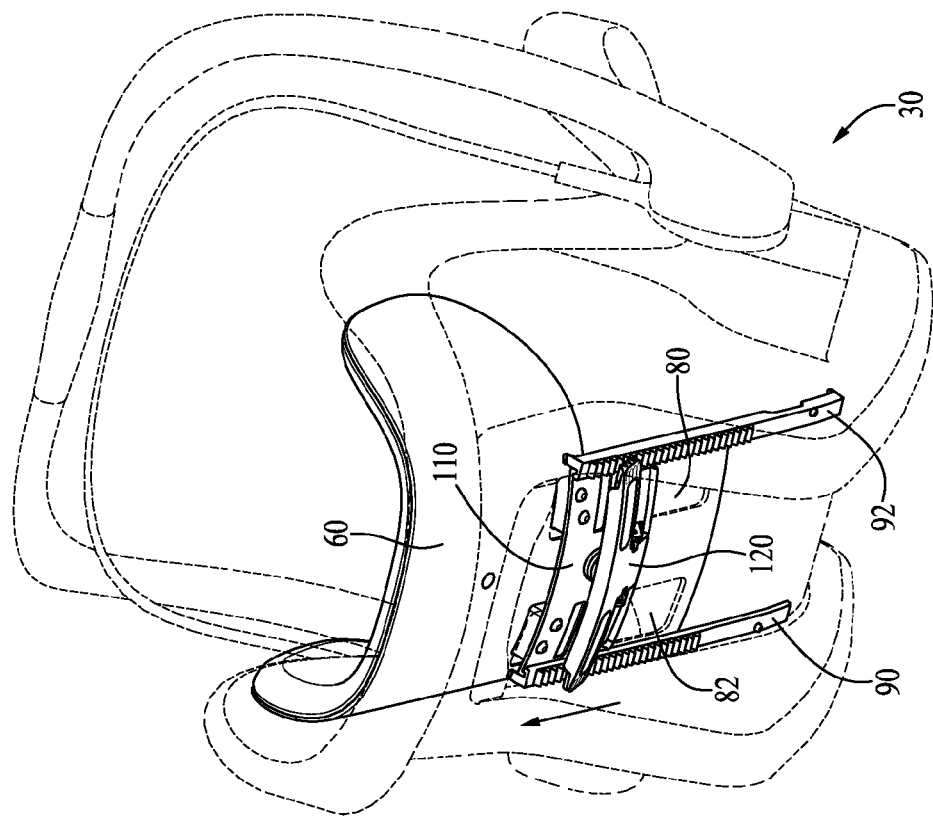
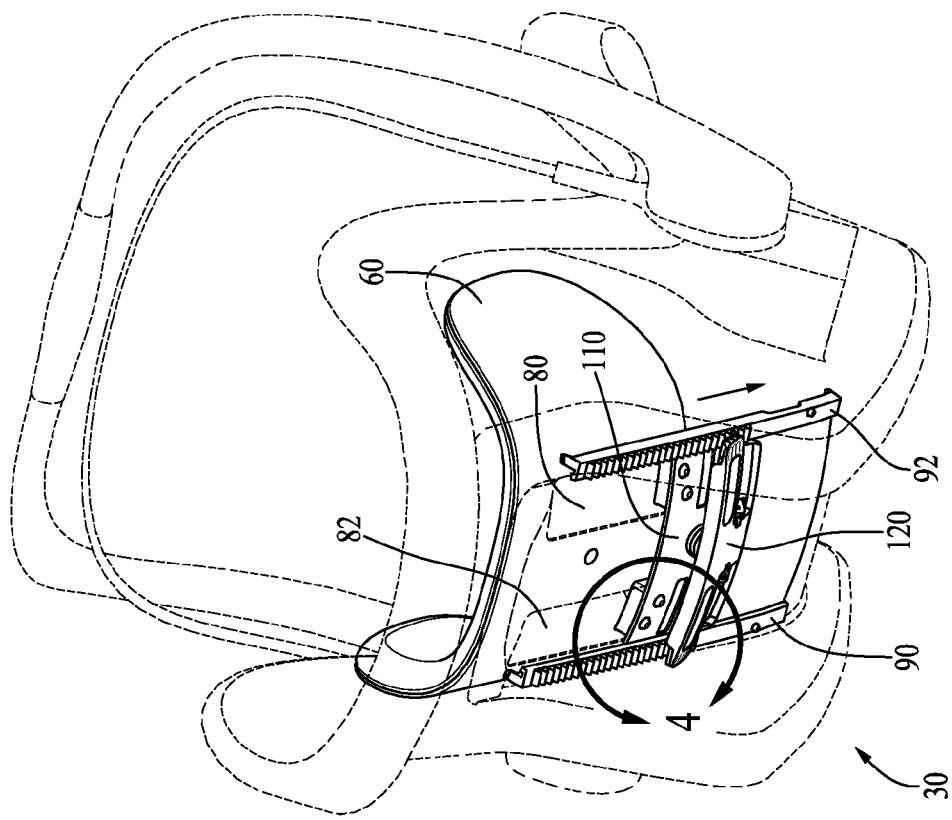

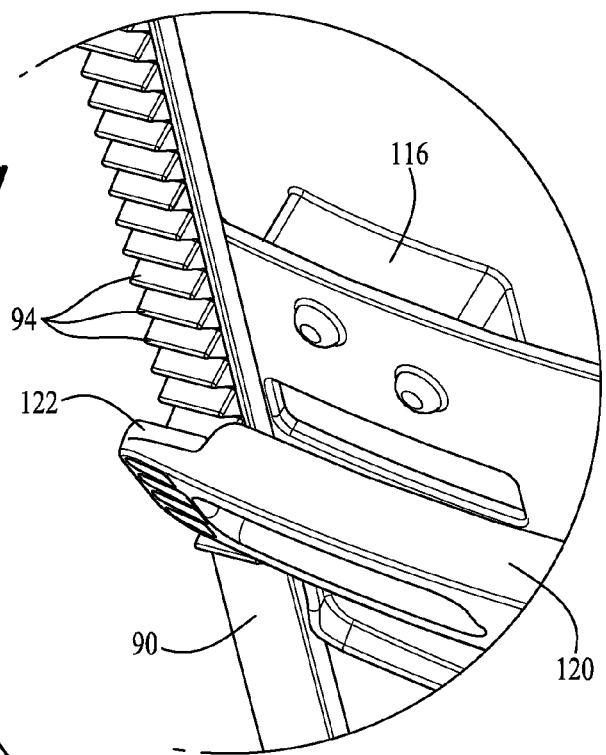
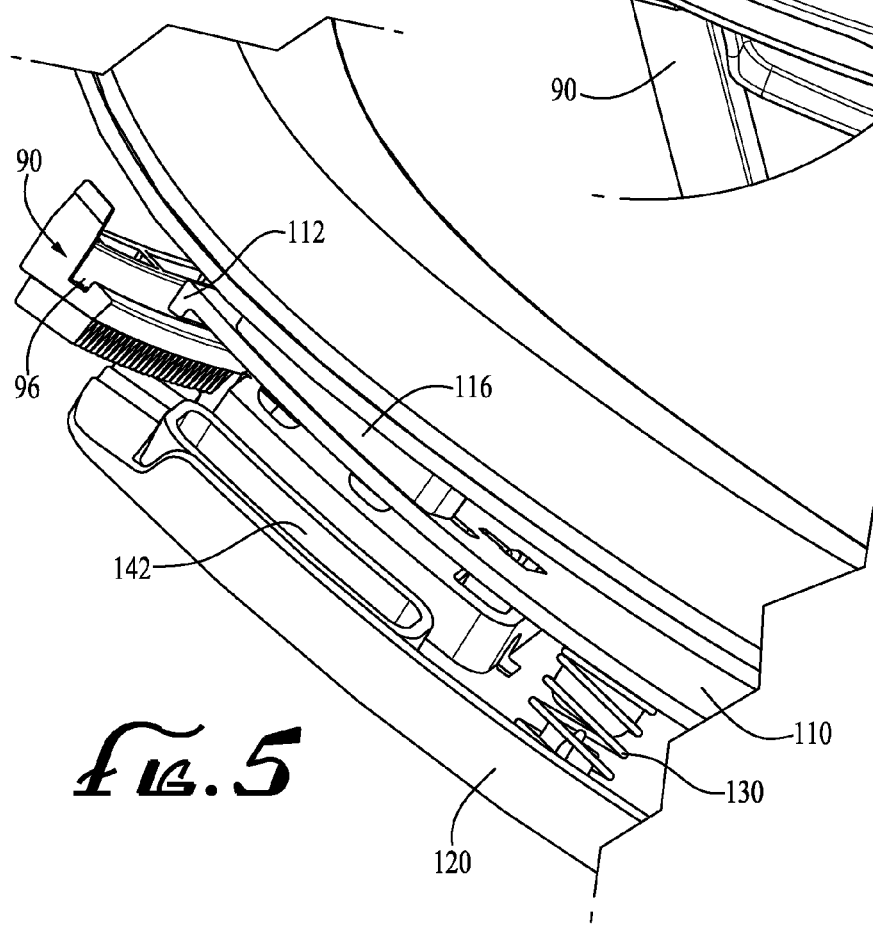

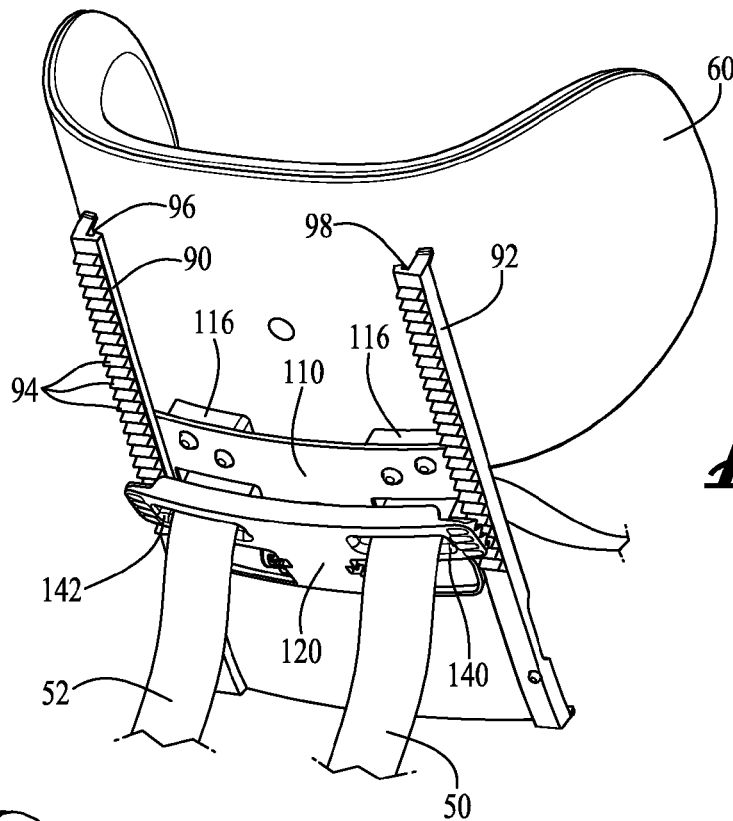
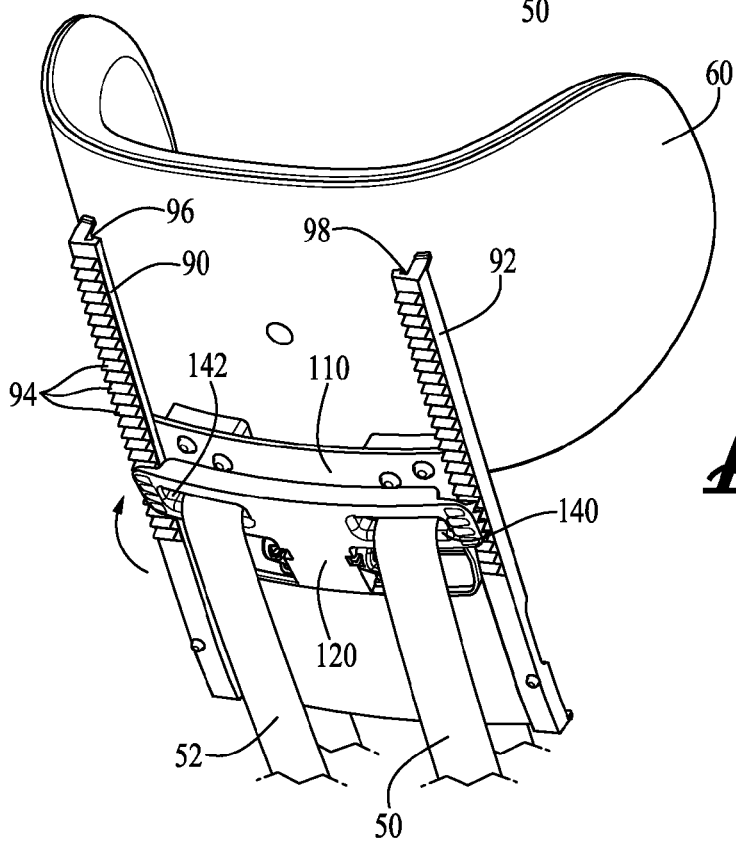

INFANT CARRIER AND CAR SAFETY SEAT WITH NO-RETHREAD HARNESS ADJUSTMENT

CROSS-REFERENCE TO RELATED APPLICATIONS

This application is a continuation of U.S. Non-Provisional patent application Ser. No. 13/928,818 filed Jun. 27, 2013, now U.S. Pat. No. 9,162,593 B2, which claims the priority benefit of U.S. Provisional Patent Application Ser. No. 61/667,543 filed Jul. 3, 2012, and U.S. Provisional Patent Application Ser. No. 61/698,942 filed Sep. 10, 2012, the entireties of which are hereby incorporated herein by reference for all purposes.

TECHNICAL FIELD

The present invention relates generally to the field of child safety products, and more particularly to an infant carrier and car seat having a harness height adjustment mechanism that allows adjustment without rethreading of the harness belts through the seat shell.

BACKGROUND

Vehicle safety seats or "car seats" are commonly used to protect infants and young children when traveling in motor vehicles. Many car seats include a base component that is semi-permanently mounted to the passenger seat of the vehicle using the vehicle's standard seatbelt or a standard child seat Lower Anchors and Tethers for Children (LATCH) system provided in many vehicles, and a carrier component that releasably mounts to the base. The carrier allows the parent or caregiver to more easily transport the child to and from the vehicle, and provides a comfortable and portable resting place for the child.

Child safety seats typically include a harness system having a crotch strap with a female releasable coupling or buckle, and a pair of shoulder straps having male coupling elements for detachable connection to the buckle of the crotch strap. The child is securely retained in the car seat by seating the child with the crotch strap positioned between their legs, placement of the shoulder straps over the child's shoulders, and connection of the shoulder strap couplings with the buckle of the crotch strap. The straps are then tightened, typically by pulling an adjustment strap that adjusts the free length of the shoulder straps.

For proper fit and performance, it is preferable that the shoulder harness belts extend from the seatback at about the position of the top of the child's shoulders when the child is normally seated in the car seat. In order to accommodate children of different sizes, and to allow continuing use of the child car seat and carrier as a child grows, it is known to provide for height adjustment allowing the position of the shoulder harness belts to be adjusted. Some height adjustment mechanisms provide multiple sets of slots through the seatback portion of the carrier shell at different heights, whereby the belts can be removed from one set of slots and re-threaded through another set of slots at the desired height, to match the size of the child. Other "no-rethread" height adjustment mechanisms provide for belt height adjustment using a repositionable carrier plate mounted to the seat shell.

Continued improvements in the field of child safety vehicle seats and carriers are sought, providing safe performance and ease of operation. Accordingly, it can be seen that needs exist for an improved vehicle safety seat and infant carrier. It is to the provision of an improved vehicle safety seat and infant carrier meeting these and other needs that the present invention is primarily directed.

SUMMARY

In example embodiments, the present invention provides an improved vehicle safety seat and infant carrier system having a no-rethread shoulder harness belt height adjustment mechanism. The no-rethread shoulder harness belt height adjustment mechanism includes a carrier plate translationally mounted to slide up and down along the back of the carrier shell seatback portion, and a pivotally mounted positioning member that engages to retain the shoulder harness belts at a specified height upon tightening the harness belts. When the harness belts are loosened, the pivotally mounted positioning member disengages to allow movement of the carrier plate, whereby the height of the shoulder harness belts may reposition to fit the child seated in the carrier.

In one aspect, the present invention relates to a child safety seat including a seat shell having a seat base portion and a seatback portion, and having at least one elongate slot through the seatback portion, the at least one elongate slot defining a lengthwise dimension in an axial direction. The child safety seat preferably also includes a pair of guide rails extending axially along a back face of the seatback portion, each guide rail defining a guide channel. The child safety seat preferably also includes a carrier plate translationally mounted to slide within the guide channels, and a positioning member pivotally coupled to the carrier plate, the positioning member defining at least one harness belt slot. At least one harness belt extends through the at least one harness belt slot of the positioning member and through the at least one elongate slot through the seatback portion. The at least one harness belt engages the positioning member to fix the carrier plate in position relative to the seat shell when the harness belt is taut. Translation of the carrier plate relative to the seat shell when the harness belt is not taut provides height adjustment of the harness belt.

In another aspect, the invention relates to a vehicle safety seat and infant carrier system. The system preferably includes a carrier seat having a front face and a back face, and defining at least one slot through a seatback portion of the carrier seat. The system preferably also includes a pair of guide rails extending along the back face of the carrier seat, each guide rail defining a guide channel and a toothed rack having a plurality of axially spaced teeth projecting therefrom. The system preferably also includes a carrier plate slidable along the back face of the carrier seat within the guide channels, and a positioning member pivotally coupled to the carrier plate. The positioning member preferably has engagement surfaces at opposite sides thereof for engaging the teeth of the guide rails, and at least one harness belt slot generally aligned with the at least one slot through the seatback portion of the carrier seat. A spring normally biases the positioning member out of engagement with the teeth of the guide rails. At least one harness belt extends through the at least one harness belt slot of the positioning member. The at least one harness belt is configurable between a taut state wherein tension of the harness belt overcomes the spring and brings the engagement surfaces of the positioning member into engagement with the teeth of the guide rails to fix the carrier plate in position relative to the seatback, and a non-taut state wherein the engagement surfaces of the positioning member out of engagement with the teeth of the guide rails allowing repositioning of the carrier plate relative to the seatback to adjust the position of the harness belt.

In still another aspect, the invention relates to a method of adjusting a height of at least one shoulder harness strap of a vehicle safety seat without rethreading the shoulder harness strap through the vehicle safety seat. The method preferably includes tightening the shoulder harness strap to provide adjustment of the height of the shoulder harness strap while a positioning member is biased out of engagement with a toothed guiderail when the harness strap is not taut, and bringing the positioning member into engagement with the toothed guiderail when the harness strap is taut.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 1 is a front perspective view of a vehicle safety seat and infant carrier system according to an example embodiment of the present invention.

FIG. 2 is a front view of the vehicle safety seat and infant carrier system of FIG. 1.

FIGS. 3A and 3B show rear perspective views of the vehicle safety seat and infant carrier system of FIG. 1, with the shoulder harness adjustment mechanism in lowered and raised positions, respectively.

FIG. 4 is a detailed view of the carrier plate and positioning member components of the vehicle safety seat and infant carrier system as indicated in FIG. 3.

FIG. 5 is another detailed view of the carrier plate and positioning member components of the vehicle safety seat and infant carrier system, viewed from a top perspective.

FIGS. 7A and 7B show a sequence of operation of the vehicle safety seat and infant carrier system of FIG. 1, with the belts loosened and the positioning member disengaged (FIG. 7A) and with the belts tightened and the positioning member engaged (FIG. 7B).

DETAILED DESCRIPTION OF EXAMPLE EMBODIMENTS

Figure 6:
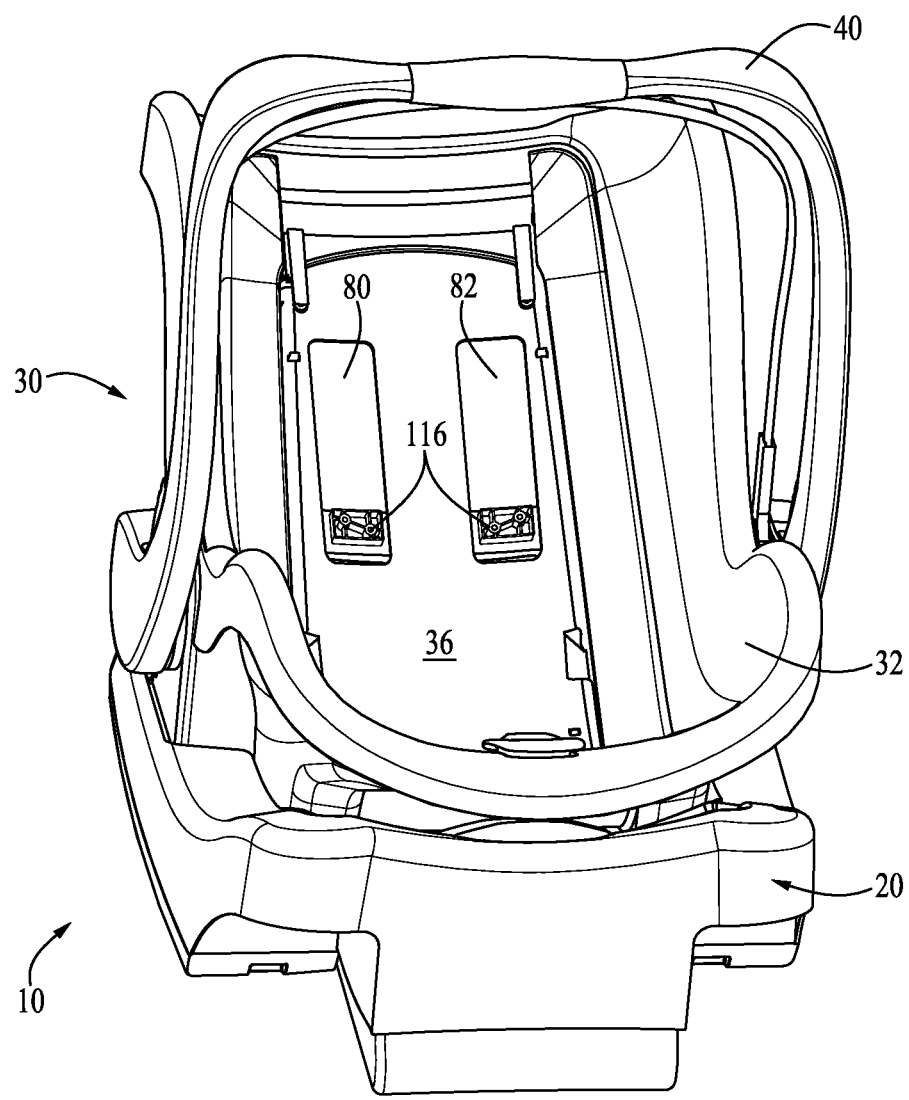
FIG. 6 is a front perspective view of the vehicle safety seat and infant carrier system of FIG. 1, with portions of the soft goods removed to show underlying components.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-7 show a vehicle safety seat and infant carrier system 10, generally comprising a base portion 20 and a carrier seat portion 30. The base portion 20 preferably includes one or more releasable coupling elements 22 for cooperative engagement with corresponding coupling elements of the carrier portion 30 to provide selective attachment and removal of the carrier to and from the base. The base portion 20 preferably also includes one or more belt receiving openings and/or coupling elements for removably securing the base in place on a passenger seat of an automobile or other vehicle, for example using the vehicle seat belt and/or child safety seat Lower Anchors and Tethers for Children (LATCH) connections. Optionally, the base portion 20 further comprises a leveling mechanism for adjusting the inclination of the base and seat, and/or various other safety and convenience features.

The carrier seat portion 30 generally comprises a seat shell 32 comprising a seat base portion 34 and a seatback portion 36, a carrier handle 40 and a canopy frame 42 pivotally mounted to the seat shell, a pair of shoulder harness belts 50, 52 extending through the seatback, and a headrest 60. The headrest 60 and front surfaces of the seat base portion 34 and the seatback portion 36 are optionally covered with fabric and padding soft-goods for comfort and insulation. A harness adjustment strap 70 extends through a releasable retention clamp in the seat base portion 34, and is coupled to the shoulder harness belts 50, 52 behind the seat shell to tighten and adjust the shoulder harness belts on a child seated in the carrier seat 30. In example embodiments, the seat shell comprises a unitary plastic molding, or alternatively comprises two or more parts attached together.

The shoulder harness belts 50, 52 extend through elongate slots 80, 82 in the seatback 36 of the shell 32, as seen best in FIG. 6. The slots have a lengthwise dimension extending axially along the seatback 36 that is preferably at least about two times, and more preferably three to four times with width of the slots in the transverse direction. The shoulder harness belts 50, 52 thus define a front segment or loop extending forward of the seat shell 32 (shown in FIGS. 1 and 2) and a rear segment behind the seat shell (shown in FIGS. 7A and 7B). The shoulder harness belts 50, 52 preferably comprise a length of strong flexible webbing of nylon, polyester and/or other constituent material(s). Buckle couplings secured to the front segment of the shoulder harness belts 50, 52 releasably connect to a buckle on the crotch strap or in the seat base to secure a child seated in the carrier seat, and a chest clip is optionally provided to hold the shoulder harness belts in proximity to one another across the child's chest.

First and second elongate guide rails 90, 92 extend lengthwise in the axial direction on the back face of the seatback 36, generally parallel to one another and spaced a widthwise distance from one another. The guide rails 90, 92 may be integrally formed with the seatback portion 36 of the seat shell 32, or can be separately formed and attached thereto. As seen best in FIGS. 4 and 5, the guide rails 90, 92 each comprise a distal face forming a toothed rack having a plurality of axially spaced, parallel teeth or ridges 94 projecting rearwardly away from the seatback. The guide rails 90, 92 each further comprise a proximal face defining an axially extending guide channel or track 96, 98 between the guide rail and the seatback. The guide channels 96, 98 each face inwardly toward one another, and toward the center of the seatback 36. In an alternative embodiment, the distal faces of the guide rails each include a high-friction braking surface, instead of the teeth or ridges.

A carrier plate 110 is mounted between the guide channels 96, 98, with a guide flange 112 extending axially along each side of the carrier plate sliding translationally within the guide channels. A close running fit between the carrier plate 110 and the guide channels 96, 98 allows the carrier plate to slide smoothly up and down along the rear face of the seatback 36 between a lowered position closer to the seat base portion 34 (FIG. 3A) and a raised position further from the seat base portion (FIG. 3B). One or more struts 116 connect the carrier plate 110 to the headrest 60 through the slots 80, 82 through the seatback 36 of the seat shell 32. The struts are configured to slide freely up and down through the slots 80, 82 to allow vertical height adjustment of the headrest 60 by repositioning the carrier plate between its raised and lowered positions. Contact of the struts with the upper and lower edges of the slots 80, 82 defines the upper and lower limits of travel, respectively, of the carrier plate 110 and thereby also of the headrest 60.

A positioning member 120 is pivotally mounted to the carrier plate 110, and extends transversely from a first side for engagement with the first guide rail 90 to a second side for engagement with the second guide rail 92. One or more engagement teeth or ribs 122 at each side of the positioning member are configured for cooperative engagement with the teeth 94 of the guide rails 90, 92. The positioning member 120 is pivotally mounted to the carrier plate 110 by one or more pin connections or hinges positioned toward the lower end of the positioning member, allowing the upper end of the positioning member to rock or rotate between an outward or disengaged position (FIG. 7A) wherein its engagement ribs 122 are disengaged from the teeth 94 of the guide rails 90, 92, and an inward or engaged position (FIG. 7B) wherein its engagement ribs are engaged with the teeth of the guide rails. In the disengaged position, the carrier plate 110 and headrest 60 can slide up and down for height adjustment. In the engaged position, interference between the engagement ribs 122 and the teeth 94 prevent movement of the carrier plate 110 and headrest 60 relative to the seatback 36, effectively locking the carrier plate and headrest in a set position.

The positioning member 120 is normally biased toward its outward or disengaged position (FIG. 7A) by a spring 130 acting between the positioning member and the carrier plate 110. Rear segments of the shoulder harness belts 50, 52 extend through slots 140, 142 formed through the upper end of the positioning member 120, and through correspondingly positioned openings through the carrier plate 110. In this manner, tensioning of the shoulder harness belts 50, 52, for example by the parent or caregiver pulling the harness adjustment strap 70, which is coupled to the shoulder harness belts behind the seatback, to tighten the shoulder harness belts against a child seated in the carrier seat 30, overcomes the bias of the spring 130, and pivots the positioning member inwardly into its inward or engaged position (FIG. 7B) and into engagement with the teeth 94 of the guide rails 90, 92 to lock the positioning member in place. Passage of the shoulder harness belts 50, 52 through the slots 140, 142 in the carrier plate also serves to provide height adjustment of the shoulder harness belts in conjunction with the height adjustment of the headrest 60, as the positioning member and carrier plate carry the straps up and down along the back side of the seatback 36. A flap 150 of flexible fabric or soft goods is optionally provided, extending below the headrest 60 along the front face of the seatback 36 to cover the slots 80, 82 for improved comfort, but preferably does not affect the movement of the shoulder harness belts 50, 52. Because the shoulder harness belts 50, 52 and the headrest 60 are free to slide as the harness belts are tightened, and are locked into position only when the harness belts become taut, the adjustment mechanism of the present invention allows the height of the harness belts and headrest to automatically position at the shoulder height of the child seated in the carrier seat as the harness belts are tightened, and to fix the harness belts and headrest in that set position when the harness belt is pulled taut against the child's shoulders.

In use, a vehicle safety seat and infant carrier system according to the present invention enables a method of positional adjustment of the height of a headrest and/or shoulder harness belts of a carrier seat, without rethreading of the harness belts through the seatback. The shoulder harness belts are initially loosened and the harness buckle and chest clip disengaged, and the headrest and shoulder harness belts are optionally moved to a raised position along the seatback. A child is placed onto the seat base portion and seatback in a semi-reclined seated position. The shoulder harness belts are placed over the child's shoulders, and the harness buckle and chest clip are connected. The shoulder harness belts are tightened by pulling the harness adjustment strap. As the belts are tightened, the positioning member remains biased out of engagement with the teeth of the guide rails, allowing the carrier plate to slide within the guide channels and bring the height of the shoulder harness belts and headrest to a specified position wherein the shoulder harness belts are positioned at the child's shoulder level. Pulling the shoulder harness belts taut then brings the positioning member into engagement with the teeth of the guide rails, fixing the positioning member, the carrier plate, the harness belts and the headrest in the specified position relative to the seat shell. When the child is to be removed, the sequence is reversed by loosening the harness adjustment strap and the shoulder harness belts, which releases the positioning member from engagement with the teeth of the guide rails, disconnecting the harness buckle and chest clip, and removing the child from the carrier seat.

While the invention has been described with reference to preferred and example embodiments, it will be understood by those skilled in the art that a variety of modifications, additions and deletions are within the scope of the invention, as defined by the following claims.

What is claimed is:

1. A mechanism for positional adjustment of shoulder harness belts for use with a child safety seat without rethreading of the shoulder harness belts through a seatback of the child safety seat, the seatback comprising at least one slot through which a shoulder harness belt extends, the at least one slot in the seatback defining a lengthwise dimension in an axial direction, the mechanism comprising:

a carrier plate movable along guide channels extending axially along a back face of the seatback wherein the carrier plate includes at least one opening positioned for receiving the shoulder harness belt extending through the at least one slot in the seatback; and a positioning member pivotally coupled to the carrier plate, the positioning member defining at least one harness belt slot positioned for receiving the shoulder harness belt extending through the at least one opening in the carrier plate.

2. The mechanism of claim 1, wherein the at least one shoulder harness belt engages the positioning member to fix the carrier plate in position relative to the seatback when the harness belt is taut, and whereby the carrier plate is movable relative to the seatback when the harness belt is not taut to provide height adjustment of the harness belt.

3. The mechanism of claim 2, wherein a pair of guide rails extend axially along the back face of the seatback, each guide rail defining one of the guide channels therein.

4. The mechanism of claim 3, wherein at least one of the pair of guide rails comprises a plurality of teeth for engagement with the positioning member when the harness belt is taut.

5. The mechanism of claim 4, further comprising a headrest mounted to the carrier plate by at least one strut extending through the at least one slot in the seatback.

6. The mechanism of claim 5, further comprising a harness adjustment strap connected to the at least one shoulder harness belt for tightening the at least one shoulder harness belt to bring the positioning member into engagement with the pair of guide rails to fix the carrier plate in position relative to the seatback.

7. The mechanism of claim 3, wherein the pair of guide rails each comprise a toothed rack having a plurality of axially spaced teeth projecting opposite the guide channel.

8. The mechanism of claim 1, wherein the carrier plate comprises first and second guide flanges extending axially along opposite sides thereof and sliding translationally within the guide channels.

9. The mechanism of claim 1, wherein the positioning member is pivotally connected to the carrier plate at a lower portion of the positioning member, and wherein the at least one harness belt slot is positioned at an upper portion of the positioning member.

10. The mechanism of claim 1, further comprising a spring for biasing the positioning member out of engagement with the guide rails to allow translation of the carrier plate relative to the seatback when the shoulder harness belt is not taut.

11. A carrier plate for providing height adjustment to a shoulder harness belt of a child safety seat, the carrier plate being movable along a seatback of the child safety seat whereby the position of the shoulder harness belt can be adjusted, the carrier plate comprising a guide portion extending axially along each side of the carrier plate for sliding within guide channels positioned along the seatback, the carrier plate further comprising a pivotally mounted positioning member having a harness belt slot for receiving the shoulder harness belt, whereby the carrier plate is movable along the seatback when the shoulder harness belt is not taut, and whereby the positioning member engages the seatback such that the carrier plate is fixed in position relative to the seatback when the shoulder harness belt is taut, wherein the seatback of the child safety seat defines a seatback slot extending therethrough, and wherein the shoulder harness belt extends through the harness belt slot of the positioning member, through an opening in the carrier plate, and through the seatback slot.

12. The carrier plate of claim 11, wherein the positioning member comprises an engagement member for cooperative engagement with a series of positioning teeth spaced along the seatback.

13. A carrier plate for providing height adjustment to a shoulder harness belt of a child safety seat, the carrier plate being movable along a seatback of the child safety seat whereby the position of the shoulder harness belt can be adjusted, the carrier plate comprising a guide portion extending axially along each side of the carrier plate for sliding within guide channels positioned along the seatback, the carrier plate further comprising a pivotally mounted positioning member having a harness belt slot for receiving the shoulder harness belt, whereby the carrier plate is movable along the seatback when the shoulder harness belt is not taut, and whereby the positioning member engages the seatback such that the carrier plate is fixed in position relative to the seatback when the shoulder harness belt is taut, wherein the positioning member is pivotally connected to the carrier plate at a lower portion of the positioning member, and wherein the at least one harness belt slot is positioned at an upper portion of the positioning member.

14. The carrier plate of claim 13, wherein the positioning member comprises an engagement member for cooperative engagement with a series of positioning teeth spaced along the seatback.

15. The carrier plate of claim 13, further comprising a spring for biasing the positioning member out of engagement with the seatback to allow adjustment of the carrier plate relative to the seatback when the shoulder harness belt is not taut.

16. The carrier plate of claim 11, further comprising a spring for biasing the positioning member out of engagement with the seatback to allow adjustment of the carrier plate relative to the seatback when the shoulder harness belt is not taut.

17. A mechanism for positional adjustment of shoulder harness belts for use with a child safety seat comprising a seatback including at least one slot defining a lengthwise dimension in an axial direction, the mechanism comprising:
 a carrier plate movable along guide channels extending axially along a back face of the seatback;
 a positioning member pivotally coupled to the carrier plate, the positioning member defining at least one harness belt slot;
 at least one harness belt extending through the at least one slot in the seatback and through the at least one harness belt slot of the positioning member; and
 a spring for biasing the positioning member out of engagement with the guide channels to allow translation of the carrier plate relative to the seatback when the shoulder harness belt is not taut.

18. The mechanism of claim 17, wherein the positioning member comprises an engagement member for cooperative engagement with a series of positioning teeth spaced along the seatback.

19. The mechanism of claim 17, wherein the positioning member is pivotally connected to the carrier plate at a lower portion of the positioning member, and wherein the at least one harness belt slot is positioned at an upper portion of the positioning member.

* * * * *